(12) United States Patent
Alber (10) Patent No.: US 12,377,499 B2
(45) Date of Patent: Aug. 5, 2025

(54) METHOD FOR PRODUCING A WELDED T-BEAM OR I-BEAM PROFILE

(71) Applicant: BAOSTEEL LASERTECHNIK GMBH, Ravensburg (DE)

(72) Inventor: Gerhard Alber, Berg (DE)

(73) Assignee: BAOSTEEL LASERTECHNIK GMBH, Ravensburg (DE)

( * ) Notice: Subject to any disclaimer, the term of this patent is extended or adjusted under 35 U.S.C. 154(b) by 625 days.

(21) Appl. No.: 17/635,898

(22) PCT Filed: Aug. 10, 2020

(86) PCT No.: PCT/EP2020/072413
§ 371 (c)(1),
(2) Date: Feb. 16, 2022

(87) PCT Pub. No.: WO2021/032523
PCT Pub. Date: Feb. 25, 2021

(65) Prior Publication Data
US 2022/0297242 A1 Sep. 22, 2022

(30) Foreign Application Priority Data
Aug. 20, 2019 (DE) ...................... 10 2019 122 307.5

(51) Int. Cl.
*B23K 37/00* (2025.01)
*B23K 31/02* (2006.01)
(Continued)

(52) U.S. Cl.
CPC .......... *B23K 31/022* (2013.01); *B23K 37/047* (2013.01); *C21D 9/0068* (2013.01); *B23K 2101/28* (2018.08)

(58) Field of Classification Search
CPC ................ B23K 31/022; B23K 37/047; B23K 2101/28; C21D 9/0068
See application file for complete search history.

(56) References Cited

U.S. PATENT DOCUMENTS 3,182,179 A * 5/1965 Anderson, Sr. ...... B23K 33/004
219/137 R
3,391,267 A 7/1968 Rudd
(Continued)

FOREIGN PATENT DOCUMENTS

AT 263505 B * 7/1968
CN 101474727 A 7/2009
(Continued)

OTHER PUBLICATIONS

Office Action for German Patent Application No. 102019122307.5 dated Jan. 16, 2023, 8 pages.
(Continued)

Primary Examiner — Kiley S Stoner
(74) Attorney, Agent, or Firm — Christopher J. Volkmann; KELLY, HOLT & CHRISTENSON, P.L.L.C.

(57) ABSTRACT

A method for producing a welded I-beam profile includes providing a first flat material as a first flange of the I-beam profile, providing a second flat material as a second flange of the I-beam profile, and providing a third flat material as a web of the I-beam profile. The method includes aligning and guiding the first flange between first flange guiding rollers, aligning and guiding the second flange between second flange guiding rollers, and aligning and guiding the web between web guiding rollers. The web is arranged between the flanges in a plane that is perpendicular to the flanges for forming the I-beam. The method includes connecting the first flange to a first longitudinal edge of the web by a first welding operation in a welding station, and connecting the second flange to a second longitudinal edge of the web by a second welding operation in the welding station.

14 Claims, 4 Drawing Sheets

(51) Int. Cl.
  *B23K 37/047* (2006.01)
  *C21D 9/00* (2006.01)
  *B23K 101/28* (2006.01)

(56) References Cited

U.S. PATENT DOCUMENTS

| 11,504,808 | B2 | * | 11/2022 | Pinarello | E21B 19/00 |
| 2019/0084027 | A1 | * | 3/2019 | Werz | B21D 35/006 |

FOREIGN PATENT DOCUMENTS

| CN | 101622365 | A | * | 1/2010 | B23K 11/16 |
| CN | 103521963 | A | * | 1/2014 | B23K 37/00 |
| CN | 104028938 | A | | 9/2014 | |
| CN | 107530750 | A | | 1/2018 | |
| CN | 106334892 | B | * | 6/2018 | |
| CN | 108422140 | A | * | 8/2018 | B23K 37/0211 |
| CN | 109202283 | A | * | 1/2019 | B23K 26/21 |
| CN | 112108784 | A | * | 12/2020 | |
| DE | 1752680 | A | | 7/1971 | |
| DE | 106576 | A1 | | 6/1974 | |
| DE | 4402345 | C1 | * | 5/1995 | B23K 26/034 |
| EP | 0126547 | A1 | | 11/1984 | |
| JP | H0699273 | A | | 4/1994 | |
| WO | WO 2019058402 | A1 | | 3/2019 | |

OTHER PUBLICATIONS

Second Office Action for Chinese Patent Application No. 202080058956.0 dated Jul. 18, 2023, 13 pages.
First Office Action for China Patent Application 202080058956.0, dated Feb. 17, 2023, 11 pages.
International Preliminary Report on Patentability for International Patent Application No. PCT/EP2020/072413, Date of Issuance of Report: Feb. 17, 2022, 8 pages.
Office Action for German Patent Application No. 102019122307.5 dated Apr. 27, 2020, 7 pages.
International Search Report and Written Opinion for International Patent Application No. PCT/EP2020/072413, date of mailing: Nov. 19, 2020, 13 pages with English Translation of Search Report.
"T and I-Beam manufacturing line", YouTube, Mar. 14, 2013, Retrieved from the Internet: <<https:www.youtube.com/watch?v=PTdnAzzDrxY>>; Retrieved on Nov. 5, 2020, 2 pages.

* cited by examiner

METHOD FOR PRODUCING A WELDED T-BEAM OR I-BEAM PROFILE

CROSS-REFERENCES TO RELATED APPLICATIONS

This application is a Section 371 National Stage Application of International Application No. PCT/EP2020/072413, filed Aug. 10, 2020, and published as WO 2021/032523 A1 on Feb. 25, 2021, and claims priority to German Application No. 102019122307.5, filed Aug. 20, 2019, the contents of both are hereby incorporated by reference in their entirety.

DETAILED DESCRIPTION

The present disclosure relates to a method for producing a welded T-beam profile, in particular an I-beam profile.

Welded T-beams are known from the prior art. It is usually the case that T-beams are formed from a web and one flange, and I-beams are formed from a web and two flanges. The flanges are placed onto the web and welded in the fillet between web and flange. A disadvantage of the known methods is that automatic production of the weld seam often requires multiple passes through an installation, since the structural space between the flanges is very constricted and a welding device can be introduced there only with difficulty. In particular, continuous production is possible only with great difficulty here.

An object of the present disclosure is therefore to improve known methods for producing a T-beam or an I-beam, in particular to make them more effective. This object is achieved by the method according to an embodiment of the invention. Advantageous refinements and expedient configurations are specified in the dependent claims.

An embodiment of the invention relates to a method for producing a welded I-beam profile, comprising the following steps:
providing a first flat material as the first flange of the I-beam profile,
providing a second flat material as the second flange of the I-beam profile,
providing a third flat material as the web of the I-beam profile,
aligning and guiding the first flange between first flange guiding rollers,
aligning and guiding the second flange between second flange guiding rollers,
aligning and guiding the web between web guiding rollers, wherein the web is arranged between the flanges in a plane that is perpendicular to the flanges for the purpose of forming the I-beam,
connecting the first flange to a first longitudinal edge of the web by means of a first welding operation in a welding station,
connecting the second flange to a second longitudinal edge of the web by means of a second welding operation in the welding station,
wherein the first welding operation is performed as through-welding from a top side, facing away from the web, of the first flange to form a weld seam and/or the second welding operation is performed as through-welding from a top side, facing away from the web, of the second flange to form a weld seam.

The implementation of a welding operation as through-welding is possible by virtue of the considerably extended longitudinal extent with respect to the welding position and also allows the welding apparatus to be relocated to the outer area of the T-beam or I-beam.

Advantageous refinements and expedient configurations are specified in the dependent claims.

The present disclosure likewise provides the corresponding use of the method described also for producing a simple T-beam. In that case, the present disclosure relates to a method for producing a welded beam profile, comprising the following steps:
providing a first flat material as the first flange of the T-beam profile,
providing a flat material as the web of the T-beam profile,
aligning and guiding the first flange between first flange guiding rollers,
aligning and guiding the web between web guiding rollers, wherein the web is arranged next to the flange in a plane that is perpendicular to the flange for the purpose of forming the T-beam,
connecting the first flange to a first longitudinal edge of the web by means of a first welding operation in a welding station,
wherein the first welding operation is performed as through-welding from a top side, facing away from the web, of the first flange to form a weld seam.

The advantageous refinements of the dependent claims are claimed correspondingly in the manner described below.

Within the meaning of the present disclosure, flat material includes both already prefabricated raw material (semi-finished products) and endless materials fed to the installation, which can be unwound from a coil and fed to the installation, for example. In addition, the upstream provision of a processing stage for producing semi-finished products from an endless strip (coil) by cutting to length, longitudinal cutting and straightening is also intended.

The further features of embodiments of the invention are to be explained in more detail with reference to the exemplary embodiment presented below. However, in this respect the invention is not limited to the embodiment presented.

Figure 1:
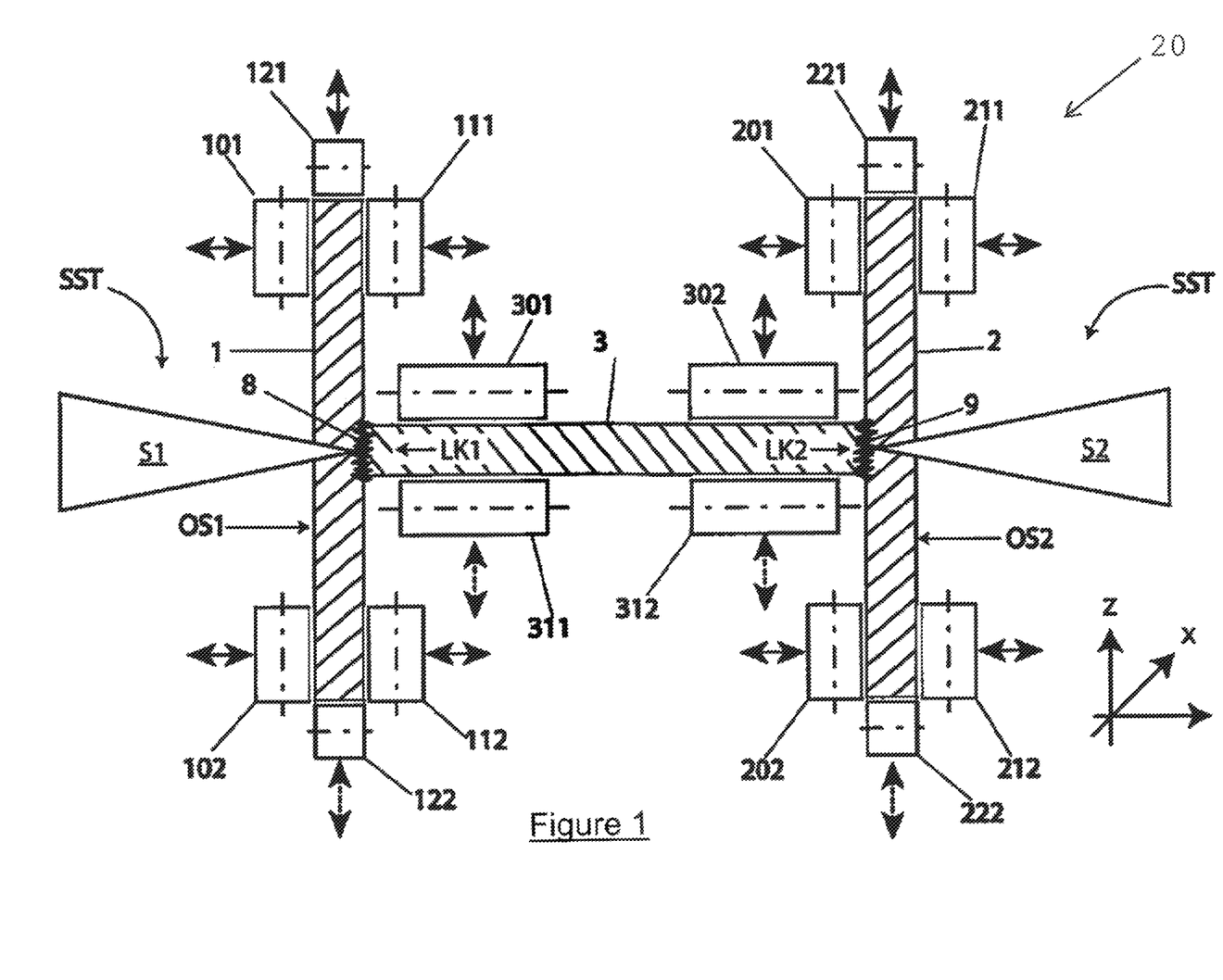
FIG. 1 shows a cross section through an installation for carrying out a method in the area of the welding stations, in one example.

In detail, FIG. 1 shows a section through an installation 20 for producing a welded I-beam profile. In this context, a first flat material as the first flange 1 of the I-beam profile and a second flat material as the second flange 2 of the I-beam profile are connected to a third flat material as the web 3 of the I-beam profile. The first flange 1 is aligned and guided between first flange guiding rollers 101, 102, 111, 112, 121, 122.

In the process, the first flange 1 is guided in a first spatial direction y between the rollers 101, 102, which lie against a top side OS1 of the first flange 1, and the rollers 111, 112, which lie against an oppositely situated bottom side of the first flange 1, wherein in this regard the first flange 1 is guided in a second spatial direction z between the roller 121, which lies against a left-hand lateral surface of the first flange 1, and the roller 122, which lies against a right-hand lateral surface of the first flange 1.

The second flange 2 is correspondingly aligned and guided between second flange guiding rollers 201, 202, 211, 212, 221, 222.

The web 3 is aligned and guided between web guiding rollers 301, 302, 311, 312, wherein the web 3 is arranged between the flanges 1, 2 in a plane that is perpendicular to the flanges 1, 2 for the purpose of forming the I-beam.

In the section illustrated, the first flange 1 is connected to a first longitudinal edge LK1 of the web 3 by means of a first welding operation S1 in a welding station SST, and the second flange 2 is connected to a second longitudinal edge LK2 of the web 3 by means of a second welding operation S2 in the welding station SST.

Figure 2:
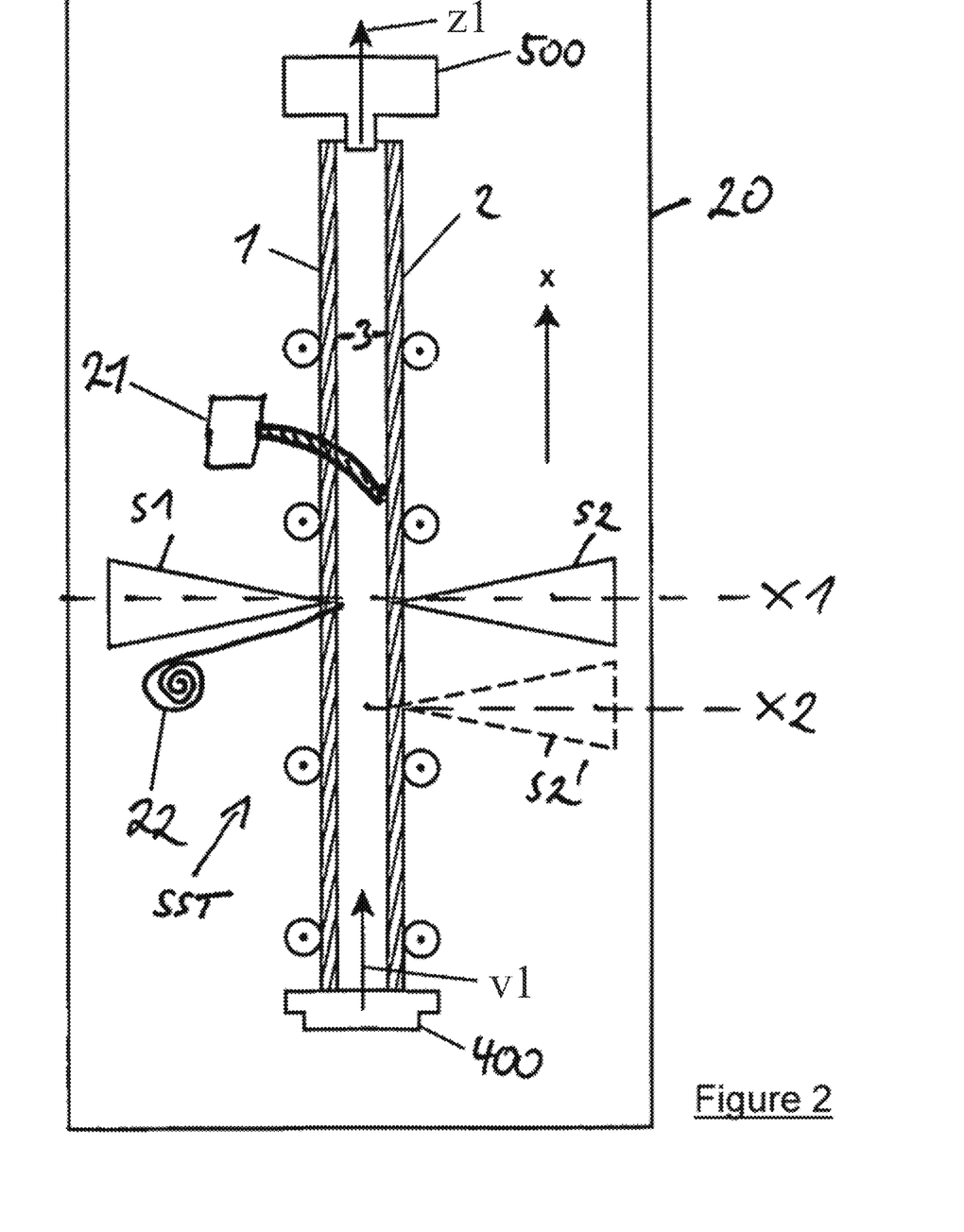
FIG. 2 shows a schematic plan view of an installation, in one example.

As is claimed, here the first welding operation S1 is performed as through-welding from a top side OS1, facing away from the web 3, of the first flange 1 to form a weld seam 8. In the arrangement illustrated, the second welding operation S2 is also effected as through-welding from a top side OS2, facing away from the web 3, of the second flange 2 to form a weld seam 9. The welding operations may be performed exactly on opposite sides at the same time, or they may be performed in a slightly offset order in relation to one another, as illustrated in FIG. 2 as S2 and S2'.

It can be seen that sufficient structural space is available for the welding operations S1 and S2, since the roller arrangements do not occupy any structural space to this effect.

In the present installation, the first flange 1 and/or the second flange 2 and/or the web 3 are fixed by the guiding rollers in two spatial directions z, y in such a way that only a movement in the longitudinal direction x is possible, in order to ensure continuous production that is reliable in terms of the process.

FIG. 1 also illustrates that the guiding rollers are designed as at least partially adjustable, in particular settable to various material thicknesses. The feed of the guiding rollers is indicated by double-headed arrows, it also being possible to form rigid rollers for structural reasons, for example the rollers 311 and 312, which act as a support in the z-direction.

The guiding rollers may also be driven, at least in part, in particular at least in certain portions, for moving or advancing the first flange 1 and/or the second flange 2 and/or the web 3, insofar as this is an alternative or in addition to the transport solution of the slide 400 and gripper 500 that is described below.

Within the meaning of the present disclosure, guiding rollers may also be at least partially replaced by other guiding means, e.g. sliding guides or the like.

FIG. 2 illustrates a possible variation of the arrangement of the welding operations. Here, the first welding operation S1 and the second welding operation S2 are performed on opposite sides at a position X1. However, there is also the possibility that the first welding operation S1 and the second welding operation S2' are performed offset in relation to one another at a position X1 for the first welding operation S1 and a position X2 for the second welding operation ST.

Depending on the structural space available or the intended welding parameters, which for example also depend on the material thickness of the flat materials to be welded together, an arrangement at positions X1 and X2 can be technically expedient.

To be mentioned by way of example, although it is not imperative, in this respect is a cooling step that is provided downstream of the first welding operation S1 and/or downstream of the second welding operation S2, in particular an application of coolant 21 to the fillet of the weld seam, as is illustrated in FIG. 2 downstream of position X1 by the cooling means 21.

Provision is also made for the weld seam to be annealed upstream or downstream of the first welding operation S1 and/or upstream or downstream of the second welding operation S2, wherein the annealing is effected in particular as continuous annealing or as induction annealing of the weld seam, but for reasons of clarity this is not illustrated in FIG. 2. Annealing improves the quality of the weld seam and reduces or avoids deformations in the material and the beam produced.

FIG. 2 moreover shows that a filler material, in particular a filler wire 22 or some other means for alloying the material, may be introduced during the first welding operation S1. This may also take place correspondingly at the welding operation S2.

In addition, a method step for material preparation, in particular preparation of the material edges to be welded together, is possible upstream of the first welding operation S1 and/or upstream of the second welding operation S2, but this is likewise not illustrated in the present case. Edge preparation improves the quality of the weld seam and ensures continuous production of the beams to be produced.

A slide 400 is provided to at least for some time transport or move the first flange 1 and move the second flange 2 and move the web 3, wherein the slide 400 is arranged upstream of the welding station SST in the run-through direction, lies against the first flange 1 and the second flange 2 and the web 3 and performs the movement as an advancing movement in the longitudinal direction x. The slide 400 moves the components 1, 2 and 3 by continuous advancement through the welding station SST, depending on the advancement speed required by the welding operations S1 and S2.

As soon as the beam to be produced has been pushed far enough through the welding station SST, the first flange 1 and the second flange 2 and the web 3 are moved at least for some time by a gripper 500. The gripper 500 is arranged downstream of the welding station SST in the run-through direction, grips the first flange 1 and/or the second flange 2 and/or the web 3 and performs the movement as a pulling movement in the longitudinal direction x.

The transfer of the beam to be produced from the slide 400 to the gripper 500 causes a switch to be made from a pushing movement to a pulling movement, and the slide 400 can move separately if appropriate.

For this purpose, there is at least one point in time at which both the slide 400 and the gripper 500 lie against or grip, respectively, the first flange and/or the second flange and/or the web at the same time and in particular perform a synchronized, homogeneous movement.

In this respect, the slide may also have a multi-part form, in particular comprise multiple slide elements, so that if appropriate one slide element moves the first flange, one slide element moves the second flange and one slide element moves the web.

In this respect, the gripper may also have a multi-part form, in particular comprise multiple gripping elements, so that if appropriate one gripping element moves the first flange, one gripping element moves the second flange and one gripping element moves the web.

The transport method is moreover explained in more detail in FIGS. 3 to 6.

Figure 3:
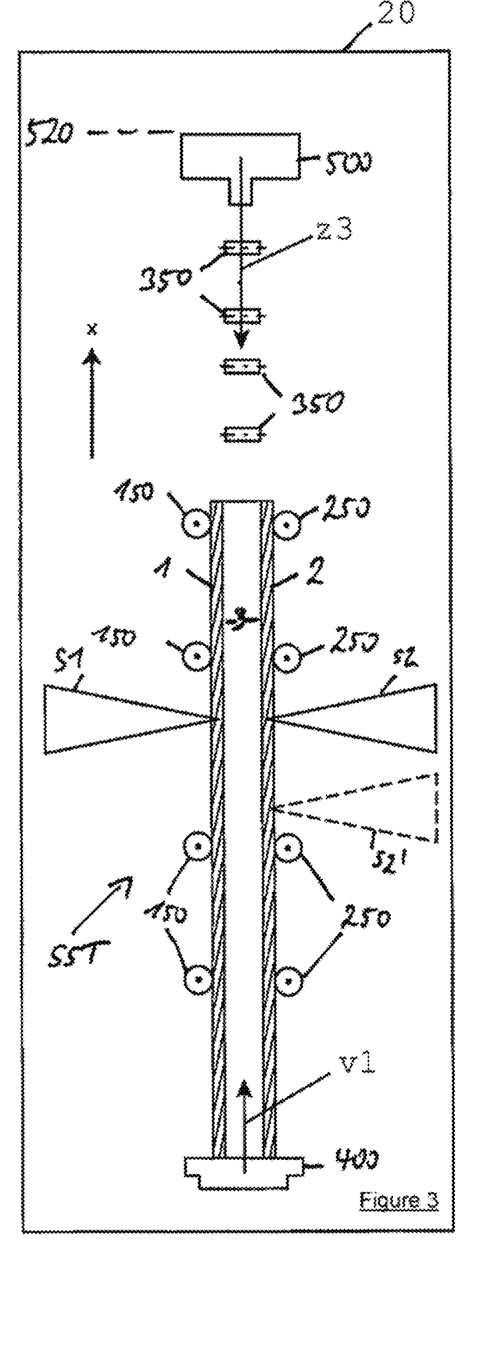
FIG. 3 shows a schematic snapshot during transport for the purpose of carrying out a method according to one example.

To that end, FIG. 3 shows a snapshot of a method for transporting the flat materials to be welded together, in particular a first flange 1 and a second flange 2 and a web 3 for producing an I-beam, through a welding station SST, the flat materials being aligned and guided by rollers 150, 250, 350. The slide 400 is arranged upstream of the welding station SST in the run-through direction and the gripper 500 is arranged downstream of the welding station SST in the run-through direction.

In FIG. 3, the slide 400 introduces the flat materials into the welding station SST as far as a first position 410 by means of a pushing movement and in doing so moves at an advancement speed v1 suitable for the welding process.

Figure 4:
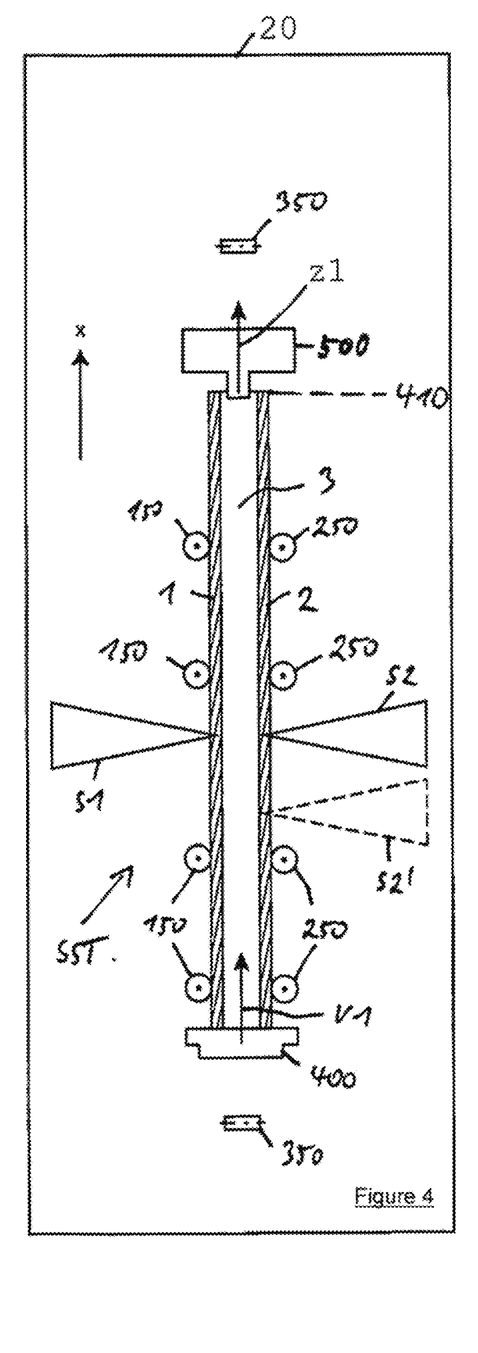
FIG. 4 shows a further schematic snapshot during transport for the purpose of carrying out a method according to one example.
Figure 5:
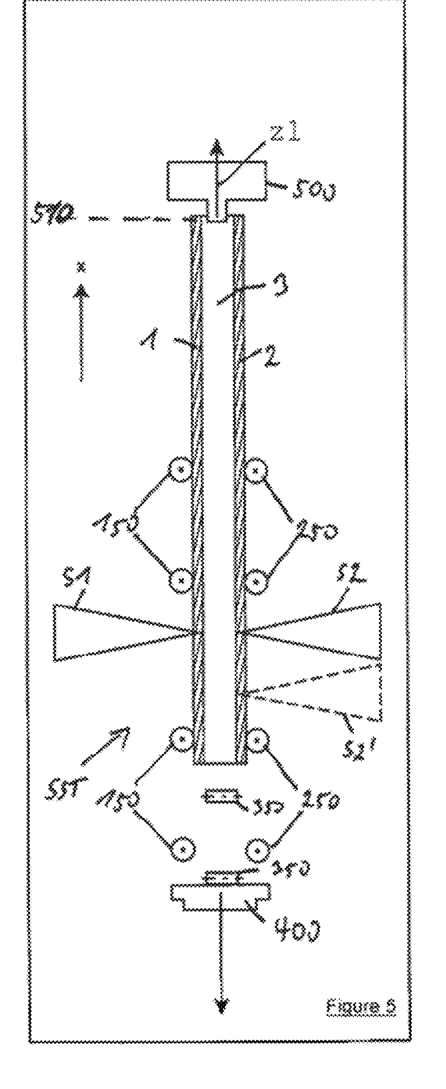
FIG. 5 shows a further schematic snapshot during transport for the purpose of carrying out a method according to one example.

In FIG. 4, the gripper 500 takes up the flat materials at the first position 410 and grips them and pulls the flat materials further through the welding station at the pulling speed z1 suitable for the welding process as far as a second position 510, illustrated in FIG. 5, by means of a pulling movement.

In this respect it is provided that, after the flat materials have been transferred to the gripper 500 in the first position 410, the slide 400 returns, counter to the advancement direction x, to a standby position 420, as illustrated in FIG. 5. At the standby position 420 illustrated in FIG. 6, the slide 400 takes up a further set of flat materials, in particular a first flange 1a and a second flange 2a and a web 3a for producing a further I-beam, for readvancement into the welding station SST.

Figure 6:
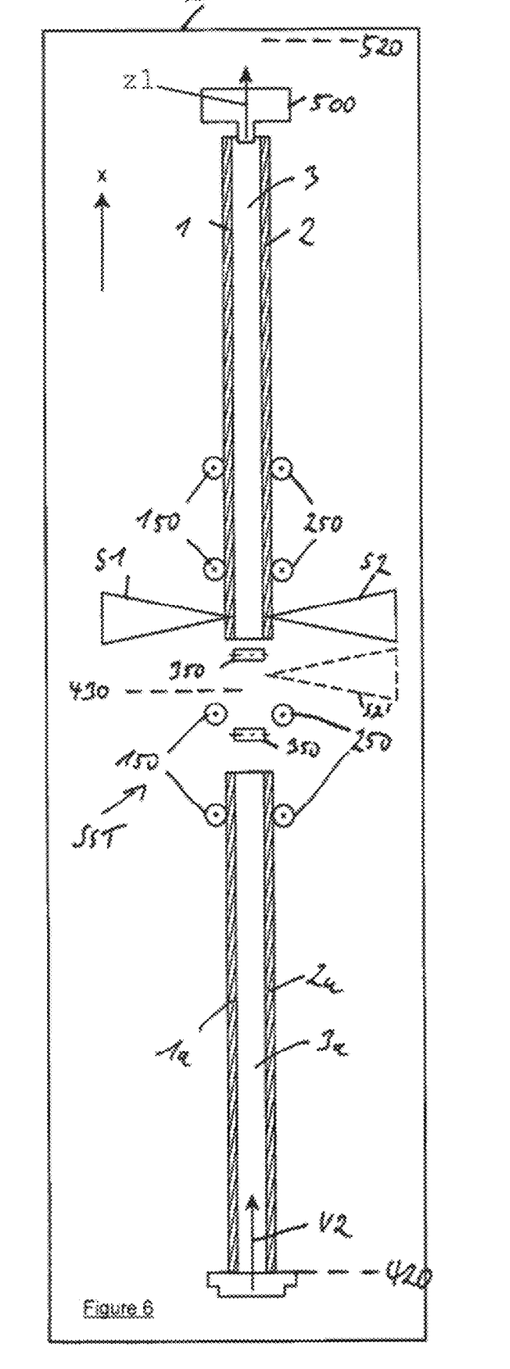
FIG. 6 shows a schematic snapshot during transport for the purpose of carrying out a method according to one example with two I-beams during continuous operation.

In order to achieve continuous production of the beam, as illustrated in FIG. 6 the slide 400, after the provision of the further set of flat materials, advances them at a speed v2 that is faster than the advancement speed v1 as far as the welding station SST, and reduces its speed to the advancement speed v1, which is matched to the welding process, when an entry position 430 of the flat materials into the welding station SST is reached. In this way, the offset between the beams to be produced in the welding station SST is minimized and may be brought almost to zero, depending on the desired control of the speeds.

In a manner corresponding to this alternating push-pull movement, the gripper 500 will dispense the welded-together flat materials at an end position 520 illustrated in FIG. 6 and move back to the first position 410 counter to the advancement direction x at a speed z3 (see FIG. 3) that is faster than the pulling speed z1, in order to take up a further set of flat materials in a gripping manner.

In this way, the sequence corresponding to FIGS. 3, 4, 5 and 6 has the effect that the flat materials, in particular the first flange 1 and the second flange 2 and the web 3 for producing a beam, in particular an I-beam, are transported continuously through the welding station SST.

A T-beam, which is welded together only from one flange and a web, is transported in a similar way to an I-beam through a corresponding welding station, with only two flat materials being moved respectively by a slide or gripper.

Although the present invention has been described with reference to preferred embodiments, workers skilled in the art will recognize that changes may be made in form and detail without departing from the spirit and scope of the invention.

LIST OF REFERENCE SIGNS

1 First flange
1a First flange
2 Second flange
2a Second flange
3 Web
3a Web
8 Weld seam
9 Weld seam
20 Installation
21 Coolant
22 Filler wire
101, 102 First flange guiding roller
111, 112 First flange guiding roller
121, 122 First flange guiding roller
150 Roller
101, 102 Roller
201, 202 Second flange guiding roller
211, 212 Second flange guiding roller
221, 222 Second flange guiding roller
250 Roller
301, 302 Web guiding roller
311, 312 Web guiding roller
350 Roller
400 Slide
410 First position
420 Standby position
430 Entry position
500 Gripper
510 Position
520 End position
LK1 First longitudinal edge of 3
LK2 Second longitudinal edge
OS1 Top side of 1
OS2 Facing-away top side of 2
S1 First welding operation
S2 Second welding operation
S2' Second welding operation
SST Welding station
v1 Advancement speed of 400
v2 Faster speed
z1 Advancement speed of 500
z3 Faster speed
x Advancement direction, longitudinal direction
X1 Position
X2 Position
y First spatial direction
z Second spatial direction

The invention claimed is:

1. A method for producing a welded I-beam profile, the method comprising:
providing a first flat material as a first flange of an I-beam profile,
providing a second flat material as a second flange of the I-beam profile,
providing a third flat material as a web of the I-beam profile,
aligning and guiding the first flange between first flange guiding rollers,
aligning and guiding the second flange between second flange guiding rollers,
aligning and guiding the web between web guiding rollers, wherein the web is arranged between the first flange and the second flange in a plane that is perpendicular to the first flange and the second flange for forming the I-beam profile,
fixing at least one of the first flange, the second flange, or the web by the web guiding rollers in two spatial directions in such a way that only a movement in a longitudinal direction is possible, connecting the first flange to a first longitudinal edge of the web by a first welding operation in a welding station, and connecting the second flange to a second longitudinal edge of the web by a second welding operation in the welding station, wherein the method comprises at least one of:

performing the first welding operation as through-welding from a top side, facing away from the web, of the first flange to form a weld seam; or performing the second welding operation as through-welding from a top side, facing away from the web, of the second flange to form a weld seam, and using, at least for some time, a slide to move the first flange, the second flange, and the web, wherein the slide is arranged upstream of the welding station in a run-through direction, lies against the first flange and the second flange and the web and performs the movement as an advancing movement in the longitudinal direction.

2. The method of claim 1, and further comprising performing the first welding operation and the second welding operation at a same time.

3. The method of claim 1, and further comprising:
performing the first welding operation and the second welding operation on opposite sides at a position.

4. The method of claim 1, and further comprising:
performing the first welding operation and the second welding operation offset in relation to one another at a position for the first welding operation and a position for the second welding operation.

5. The method of claim 1, and further comprising:
applying coolant to a fillet of the weld seam downstream of at least one of the first welding operation or downstream of the second welding operation.

6. The method of claim 1, and further comprising:
annealing the weld seam at a location that is at least one of:
upstream or downstream of the first welding operation; or
upstream or downstream of the second welding operation.

7. The method of claim 1, and further comprising:
introducing a filler material during at least one of the first welding operation or the second welding operation.

8. The method of claim 1, and further comprising:
preparing material edges to be welded together upstream of at least one of the first welding operation or the second welding operation.

9. The method of claim 1, and further comprising:
at least for some time, using a gripper to move the first flange, the second flange, and the web, wherein the gripper is arranged downstream of the welding station in a run-through direction, grips the first flange and/or the second flange and/or the web and performs the movement as a pulling movement in the longitudinal direction.

10. The method of claim 9, wherein at least at one point in time, both the slide and the gripper lie against and grip one or more of the first flange, the second flange, the web at a same time, and further comprising performing a synchronized, homogeneous movement.

11. The method of claim 1, wherein the web guiding rollers are at least partially adjustable to set various material thicknesses.

12. The method of claim 1, and further comprising:
driving the web guiding rollers to move at least one of the first flange, the second flange, or the web.

13. A method for producing a welded T-beam profile, the method comprising:
providing a flat material as a first-flange of a T-beam profile,
providing a flat material as a web of the T-beam profile,
aligning and guiding the first-flange between flange guiding rollers,
aligning and guiding the web between web guiding rollers, wherein the web is arranged in a plane that is perpendicular to the first-flange to form the T-beam profile,
fixing at least one of the flange or the web by the web guiding rollers in two spatial directions in such a way that only movement in a longitudinal direction is possible,
connecting the flange to a longitudinal edge of the web by a welding operation in a welding station, wherein
the welding operation is performed as through-welding from a top side, facing away from the web, of the flange to form a weld seam, and
using, at least for some time, a slide to move the flange and the web, wherein the slide is arranged upstream of the welding station in a run through direction, lies against the flange and the web and performs the movement as an advancing movement in the longitudinal direction.

14. An installation for producing a welded I-beam profile, wherein the installation is configured to:
provide a first flat material as a first flange of an I-beam profile,
provide a second flat material as a second flange of the I-beam profile,
provide a third flat material as a web of the I-beam profile,
align and guide the first flange between first flange guiding rollers,
align and guide the second flange between second flange guiding rollers,
align and guide the web between web guiding rollers, wherein the web is arranged between the first flange and the second flange in a plane that is perpendicular to the first flange and the second flange for forming the I-beam profile,
fix at least one of the first flange, the second flange, or the web by the web guiding rollers in two spatial directions in such a way that only a movement in a longitudinal direction is possible,
connect the first flange to a first longitudinal edge of the web by a first welding operation in a welding station,
connect the second flange to a second longitudinal edge of the web by a second welding operation in the welding station,
use, at least for some time, a slide to move the first flange, the second flange, and the web, wherein the slide is arranged upstream of the welding station in a run-through direction, lies against the first flange and the second flange and the web and performs the movement as an advancing movement in the longitudinal direction, and
perform at least one of:
the first welding operation as through-welding from a top side, facing away from the web, of the first flange to form a weld seam; or the second welding operation as through-welding from a top side, facing away from the web, of the second flange to form a weld seam.

\* \* \* \* \*